US006427517B1

(12) United States Patent
McMillan (10) Patent No.: US 6,427,517 B1
(45) Date of Patent: Aug. 6, 2002

(54) LOW FRICTION PISTON FOR GAS FLOW CALIBRATION SYSTEMS

(75) Inventor: Robert D. McMillan, Georgetown, TX (US)

(73) Assignee: McMillan Company, Georgetown, TX (US)

( * ) Notice: Subject to any disclaimer, the term of this patent is extended or adjusted under 35 U.S.C. 154(b) by 21 days.

(21) Appl. No.: 09/729,588

(22) Filed: Dec. 4, 2000

(51) Int. Cl.$^7$ .............................................. G01F 25/00
(52) U.S. Cl. ....................................................... 73/1.19
(58) Field of Search ................................ 73/1.18–1.23, 73/1.19; 277/402, 403, 407, 434, 436, 438, 460

(56) References Cited

U.S. PATENT DOCUMENTS

| | | | | |
|---|---|---|---|---|
| 2,984,529 | A | * | 5/1961 | Dailey |
| 3,120,118 | A | * | 2/1964 | Boyle .......................... 73/1.19 |
| 3,125,879 | A | | 3/1964 | Porter, Jr. |
| 3,270,549 | A | * | 9/1966 | Martin ......................... 73/1.19 |
| 3,580,045 | A | * | 5/1971 | Pfrehm ........................ 73/1.19 |
| 3,994,208 | A | | 11/1976 | Boyer |
| 4,089,533 | A | * | 5/1978 | Knudson |
| 4,479,377 | A | | 10/1984 | Jackson |
| 4,517,830 | A | | 5/1985 | Gunn |
| 4,606,218 | A | * | 8/1986 | Chisman, III ................ 73/1.23 |
| 4,800,754 | A | | 1/1989 | Korpi |
| 5,526,674 | A | | 6/1996 | Korpi |
| 5,794,512 | A | | 8/1998 | Prosch |
| 5,884,550 | A | | 3/1999 | Northam |
| 6,256,797 | B1 | * | 7/2001 | Nemoto et al. |

FOREIGN PATENT DOCUMENTS

| | | | | |
|---|---|---|---|---|
| GB | 1420754 | * | 1/1976 | ................. 73/1.22 |
| GB | 2244337 | * | 1/1976 | ................. 73/1.19 |

OTHER PUBLICATIONS

Brooks Instrument Division, Emerson Electric Co., Brooks Vol–U–Meter Gas Calibrators, Models 1052 thru 1058, (pp. 2–5) Dec. 1977.
Brooks Instrument, Design Specifications, Models 1050, 1073 to 1078DS–1050, Apr. 1977.
Brooks Instrument, Design Specifications, Models 1052 to 1058 DS–1052, Apr., 1997.
Brooks Instrument, Design Specifications, Vol–U–Meter Flow Rate Calibrators (Models 1052 to 1058) DS–1052, Apr. 1985.
Brooks Instrument, Design Specifications, Vol–U–Meter Automatic Gas Flow Calibrators DS–1050, Apr., 1985.

* cited by examiner

Primary Examiner—Robert Raevis
(74) Attorney, Agent, or Firm—Bracewell & Patterson, LLP (57) ABSTRACT

A calibration system for a tube prover used in gas flow rate calibration equipment includes a low friction piston which provides an effective seal without the use of mercury. The low friction piston is easily movable in a prover tube of the calibration system in response to gas flow rates, even low flow rates. The piston is constructed of a light weight, low friction fluorinated hydrocarbon material. The piston has first and second seals which provide a positive seal with the inner surface of the prover tube and which maintain the alignment of the piston within the prover tube.

27 Claims, 4 Drawing Sheets

LOW FRICTION PISTON FOR GAS FLOW CALIBRATION SYSTEMS

BACKGROUND OF THE INVENTION

1. Field of the Invention

The present invention relates generally to gas flow rate calibration and in particular to flow rate calibration systems for accurately measuring and establishing gas flow rates for flow meters and similar devices.

2. Description of the Prior Art

Flow rate measurement devices are used in conjunction with many industrial and scientific processes in order to measure, sense, and control gas flow rates. Such devices include flow meters, flow sensors, and flow controllers. To ensure the accuracy of a flow meter or similar device over a given range of flow rates, calibration methods capable of operating over the same range of flow rates must be available and operate accurately.

A well known method for calibrating flow rate measurement devices is the piston-tube prover method. Generally, in the piston-tube prover method, gas or other fluid is directed through the device to be calibrated which measures the flow rate in the normal manner. The gas exits the device to be calibrated and is directed to the bottom of a precision ground glass tube of a known internal diameter. A piston installed inside the tube rises according to gas flow into the bottom of the tube. After a known time interval, the displacement of the piston is measured and is multiplied by the cross-sectional internal area of the tube to determine the volume of gas that has entered the tube. This volume divided by the time interval (with adjustments for gas temperature and pressure) equals the actual gas flow rate from the flow device. The actual flow rate as measured by the piston displacement can be compared to the flow rate measured by the flow device, and the flow device can be calibrated accordingly.

The piston-glass tube prover method normally employs a light weight piston with a seal that creates very little friction against the inner surface of the glass tube. Tests have shown that the piston must be able to rise up the glass tube with a pressure differential from the bottom to the top of the piston not in excess of five inches of water in order that very precise gas flow rate measurements may be made. The piston's low friction seal also must be leak proof to maintain high accuracy.

So far as is known, previous piston provers utilized a mercury, a known hazardous fluid, seal to ensure low friction and zero gas leakage past the seal. For example, the piston-tube provers in U.S. Pat. No. 3,125,879 and U.S. Pat. No. 5,526,674 used a mercury ring seal around the piston. When piston provers were originally designed, mercury was considered to be a less dangerous material, and manufacturers were not aware of potential liability associated with the sale of mercury. However, over time the dangers and liabilities associated with mercury became well known and operator safety became a paramount concern. Various attempts were made by gas calibration equipment manufacturers to limit their liability when selling piston provers with mercury seals. For example, manufacturers provided documentation explaining the dangers of mercury, placed hazardous material labels on the piston provers to alert operators of possible health risks, and added special filters to capture mercury vapors exiting the glass tubes.

Numerous types of pistons are well known outside of the art of piston provers, but so far as is known none of these pistons were designed for use in a piston-tube prover and none are suitable for such a use. For instance, the piston disclosed in U.S. Pat. No. 3,994,208 used a piston which was unsuitable as a prover. It was designed for a high pressure environment, was constructed of a heavy, stiff material, and relied on a connecting rod to maintain its alignment within a cylinder. The piston had a cylindrical body with a deformable cylindrical flange at one end, and at rest the outside diameter of the flange was less than the inside diameter of the cylinder into which it was installed. In operation, the flange would not deform during the low pressure piston strokes, thus maintaining a relatively large clearance between the piston and the cylinder. During the high pressure strokes, where the pressure on the top of the piston was much greater than the pressure on the bottom of the piston, the flange would deform and press against the cylinder wall to form a tight seal with the cylinder. As a result, the piston maintained a tight seal against the cylinder wall only when the flange was subjected to very high pressure differential across the deformable flange, thereby pressing the flange tightly against the cylinder wall, which was the intended result of the design. However, this flange design was unsuitable for a piston-tube prover because it relied on a high pressure differential to create an effective seal against the cylinder wall, and the seal was only maintained part of the time. Without a high difference in pressure across the flange, the flange would not deform and press against the cylinder wall, and would thus allow gas leakage past the piston. An accurate piston-tube prover for gas flow requires a piston that provides an effective seal even when the pressure difference from the top of the piston to the bottom of the piston is as low as five inches of water or less.

U.S. Pat. No. 5,884,550 disclosed a piston for an internal combustion engine or compressor. The piston of this patent included a single cantilevered seal around its circumference which was designed to replace a traditional piston ring. The seal had a slightly larger diameter than the piston body (approximately 0.001 to 0.003 inches), and the seal had a uniform thickness from base to tip. To create a tighter seal, the seal was manufactured with a higher coefficient of thermal expansion and/or lower mechanical modulus than the rest of the piston. During operation, the high pressure from the engine or compressor exerted force on the seal causing it to press against and maintain contact with the cylinder. As a result, the piston relied on high pressure to create an effective seal against the cylinder wall. The integrity of the seal was created by forcing the seal against the side of the cylinder wall. The pressure differential across the seal was high enough to overcome any friction between the seal and the wall. Also, the piston was constructed of carbon or carbon composite to reduce weight and improve heat dissipation. Such a material would not be capable of flexing and conforming closely to the wall of the cylinder without the high pressure seal against the wall. If any non-uniformities existed in the cylinder wall, the piston would catch and possibly get stuck in the cylinder absent a large pressure differential to push the piston through the cylinder. Finally, the piston relied on a single seal and a connecting rod to maintain the alignment of the piston within the cylinder. The piston was not "free floating," but was instead guided through the cylinder wall by the connecting rod.

SUMMARY OF THE INVENTION

The present invention provides a tube prover flow calibration system. The flow calibration system according to the present invention includes at least one calibration tube which has an inner surface and an inner diameter. A piston with an outer end, an inner end and an outside diameter is disposed within the calibration tube. The piston itself forms a seal with the inner surface of the cylindrical tube and includes at least one flexible sealing skirt. Such a sealing skirt is located toward the outer end of the piston and maintains continuous contact with the inner surface of the tube. A processor computes gas flow rate based upon measurements of the movement of the piston within the tube and other factors.

The present invention also provides a low friction piston-glass tube prover assembly. The assembly according to the present invention includes a calibration tube which has an inner surface. A piston with an outer end and an outside diameter is disposed within the calibration tube and forms a seal with the inner surface of the calibration tube. The piston also includes at least one flexible sealing skirt which is in contact with the inner surface of the calibration tube.

The present invention further provides a low friction piston for calibrating a gas flow meter. The piston according to the present invention includes a piston body. The piston body moves longitudinally within the calibration tube in response to a gas flow in the calibration system. The piston body is also made from a resilient material and includes at least one sealing skirt which extends outwardly from the piston body. The sealing skirt contacts the inner surface of the calibration tube and seals the calibration tube against leakage of the gas flow past the piston body in the calibration tube.

DETAILED DESCRIPTION OF THE PREFERRED EMBODIMENT

Figure 1:
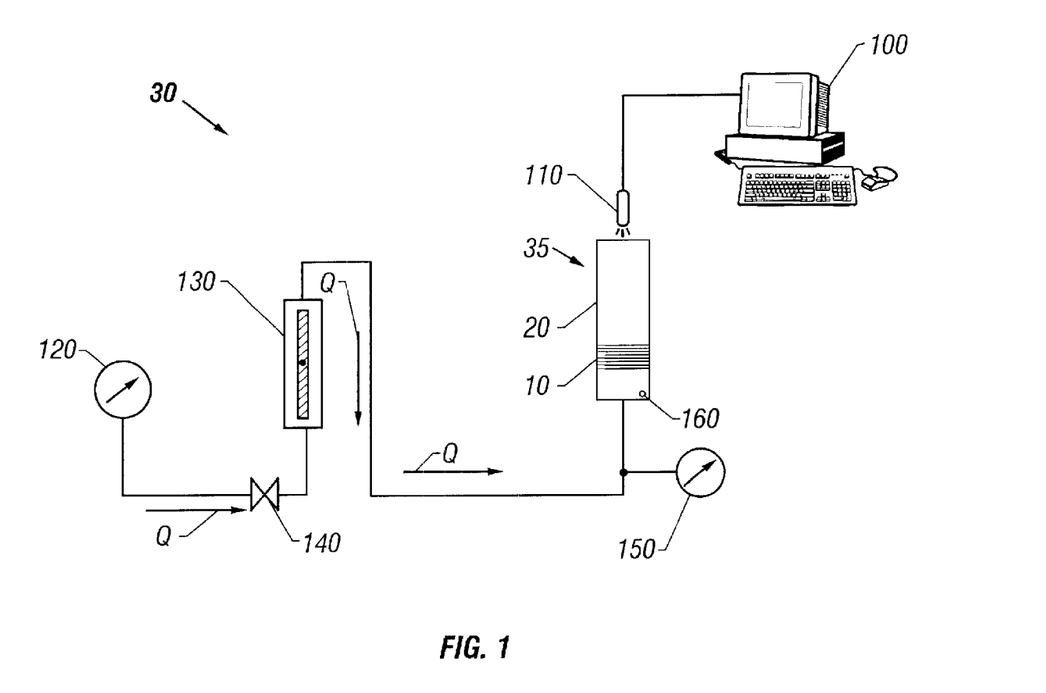
FIG. 1 is a simplified diagram of a flow rate calibration system of the type employing precision-bored cylinders with the piston of the present invention.

Referring first to FIG. 1, a flow rate calibration system 30 according to the present invention is shown. The system 30 generally includes a fluid source 120 such as a pump or compressor which supplies a fluid to a gas flow measuring device 130 to be calibrated. If desired, the device 130 to be calibrated might be the pump or the compressor itself. The present invention is not limited to the calibration of any particular type of gas flow device 130. The present invention is instead useful in calibrating any sort of machine, gage, or apparatus, the operation of which requires accuracy in flow measurement, control or the like. Furthermore, the present invention contemplates that various types of fluid flows may be measured, including water, air, various inert gases, and even hazardous, caustic or toxic fluids and vapors. The fluid flow, schematically indicated by arrow Q, leaves the device 130 to be calibrated and flows through tubes or conduits into the low friction piston-glass tube prover assembly 35 of the present invention. A valve 140 may be included as indicated upstream of the device 130 to control the flow Q through the calibration system 30.

As gas flows into the assembly 35, piston 10 moves upward longitudinally within tube 20. The piston 10 moves upward because the flow Q is introduced from the bottom of tube 20, below the piston 10. It should be noted that the top 12 of the piston 10 corresponds to an outer end with respect to the gas flow being measured. In other words, the top or outer end 12 does not generally contact the gas flow being measured because it is facing out or away from the volume of gas being measured. Similarly, the bottom 11 of the piston 10 corresponds to an inner end with respect to the gas being measured. The bottom or inner end 11 contacts the gas flow being measured because it faces inward, toward the gas flow Q. As such, when the terms top, bottom or the like are used, they can be understood as corresponding to outer or inner ends respectively. The present invention contemplates that, if desired, the vertical alignment of the piston may be altered such that the inner or bottom end 11 is actually vertically above, or on the same level or elevation with, the outer or top end 12.

Still referring to FIG. 1, displacement measurement device 110 preferably determines the distance that piston 10 travels during a given time period. The displacement measurement device 110 maybe any conventional device capable of measuring the distance that piston 10 travels. It is preferable that the displacement measurement device 1 10 measure piston displacement without physically contacting the piston 10, such as by ultrasonic waves, laser light, or any similar means. The product of the distance that the piston 10 travels and the inside circular cross-sectional area of the tube 20 generally equals the volume of gas that has entered the tube. Dividing this volume of gas by the time it took for the piston 10 to travel the measured distance generally gives the gas flow rate. An absolute pressure gauge 150 and a gas temperature sensor 160, each of the conventional type, are provided to sense the pressure and temperature of gas acting on the piston 10. The pressure and temperature readings obtained may be furnished electronically or manually to a processor 100 for flow rate computations, as will be set forth. This flow rate can be compared to the flow rate measured by the device 130 to be calibrated, and conventional calibration methods may be applied. Alternatively, some systems 30 measure the instantaneous velocity of the piston 10 rather than its overall displacement. Multiplying the instantaneous velocity by the inside cross-sectional area of the tube 20 produces the instantaneous flow rate Q. Various other conventional measurements and calculations can be made as are well known in the art. The present invention is not limited to any particular calibration scheme or set of measurements, but can be used in conjunction with various known measurements and analyses.

As shown in FIG. 1, processor 100 receives information from displacement measurement device 110. Processor 100 can be any conventional device suited to receive information or data and perform mathematical or logical operations using that data. For example, a conventional personal computer programmed with an appropriate algorithm could be used, or a specially designed processor could be employed. In a more crude system, numerical information could be gathered manually or with a hand held numerical sampling device and mathematical operations could be performed in a free standing processor or even by hand.

In a preferred embodiment, the processor 100 is integrated into the flow rate calibration system 30, so that when the piston 10 moves, that movement is detected by measurement device 110 automatically, and the processor 100 automatically determines the flow rate. Measurements of gas temperature from sensor 160 and pressure from gauge 150 permit the processor 100 to automatically remove any effect of gas temperature or pressure variations on flow rate measurements. If desired, the processor 100 is not integrated with the flow rate calibration system 30, but instead receives the data from the measurement device 110 in a batch, after the measurements are taken. For example, measurements may be recorded manually, even by hand, and entered into the processor 100 by keystrokes on a keyboard. It is contemplated that the measurement device 110 may record displacement, velocity, or any other quantity which can be used in conjunction with other known or measured quantities to determine flow rate.

Figure 2:
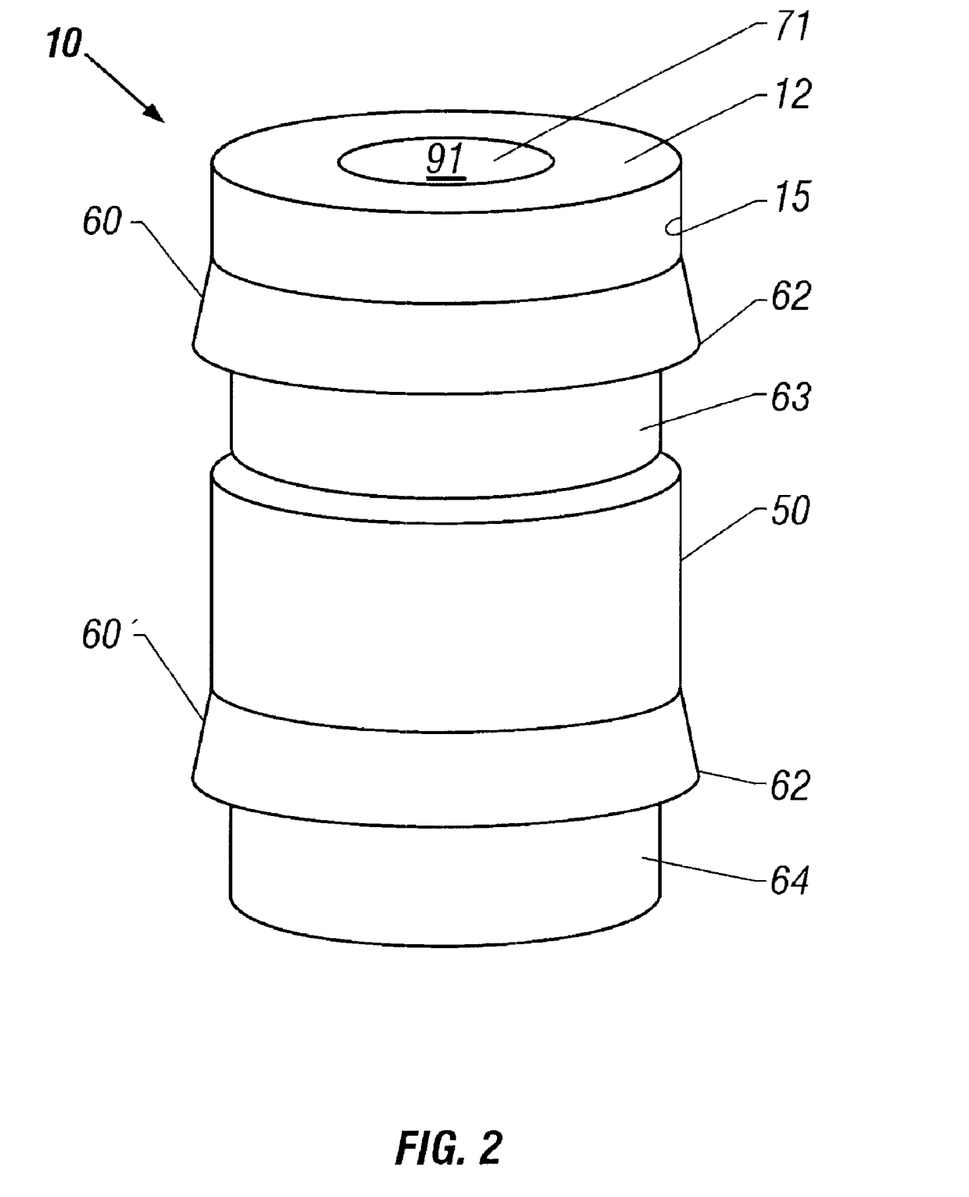
FIG. 2 is an isometric view of a piston according to the present invention.
Figure 3:
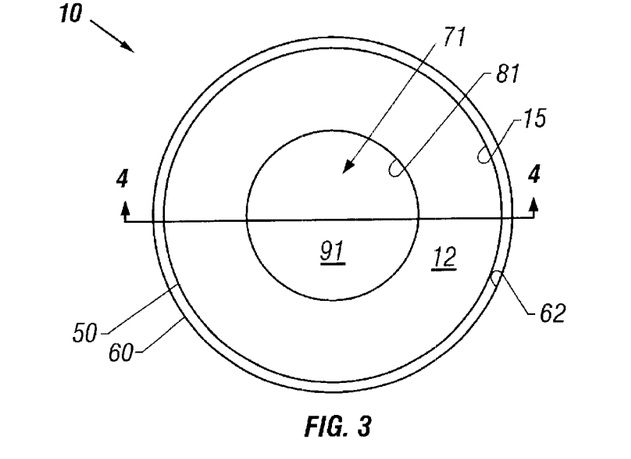
FIG. 3 is a top view of the piston of FIG. 2.
Figure 4:
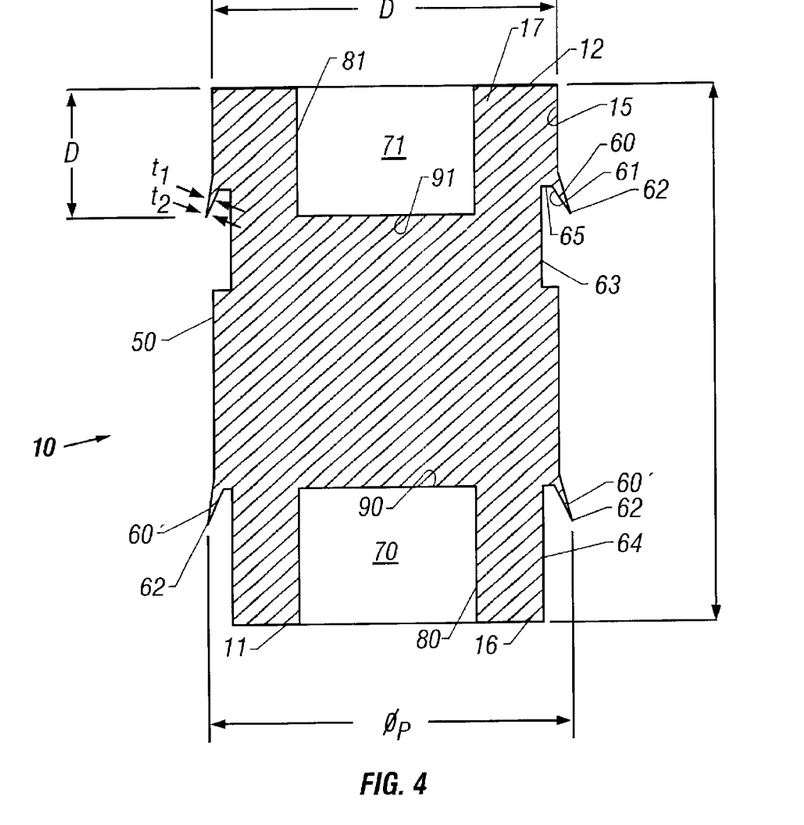
FIG. 4 is a cross sectional view of the piston along 4—4 of FIG. 3.

Referring now to FIGS. 2, 3 and 4, a low friction piston 10 according to the present invention is shown. The piston 10 is preferably cylindrical in shape with a circular cross section as shown in FIG. 3 and generally has a cylindrical piston body 50 and at least one sealing skirt 60. It should be recognized that other cross sectional shapes could be used for the piston 10, so long as the shape of the piston 10 conforms to the shape of the calibration tube 20 to provide a seal as hereinafter described. For example, it may be useful in some applications to make the piston oblong or other shape in cross-section. The sealing skirt 60 is preferably formed integrally with the piston body 50. In practice, the piston 10 of the present invention may be manufactured by machining on a lathe or other similar tool, preferably from a single piece of material. However, it is contemplated that the piston may be made from multiple pieces to be assembled, if design or manufacture requirements so dictate.

The material used for the piston body 50 and the sealing skirt 60, 60' can be any light weight, low friction, resilient material. Preferably the material is a synthetic resin, and most preferably the material is a fluorinated hydrocarbon, such as that sold under the trademark TEFLON® of E.I. duPont de Nemours, Co., particularly P.T.F.E. Teflon®. It has been found that fluorinated hydrocarbons such as this provide an excellent set of characteristics, well suited for the piston 10 of the present invention. Fluorinated hydrocarbons are light weight and allow the piston to rise under very low pressure differentials. Furthermore, fluorinated hydrocarbons are resilient as well as strong so as to provide an excellent low friction seal with the inner surface 40 of the calibration tube 20. It should be understood that other light weight, low friction materials might also be used, and that the present invention is not limited to the use of any particular material, so long as the characteristics herein described are present.

As best seen in FIGS. 2–4, the piston 10 has a piston body 50 having an inner end 11, and an outer end 12. An inner weight cutout or material relief pocket 70 is formed extending inwardly into the piston body 50 from the inner end 11 of the piston body 50 adjacent a cylindrical side wall 80 to a lower wall or base 90. Similarly, an outer weight cutout or material relief pocket 71 is formed extending inwardly into the piston body 50 from the outer end 12 of the piston body 50 adjacent a cylindrical side wall 81 to a lower wall or base 91. Typically, each of the cutouts or pockets 70 and 71 are dimensioned so that their depth is about one-quarter of a composite length L of the piston body 50.

The piston body 50 has a nominal outer diameter D measured at a cylindrical side wall 15. The diameter D is determined by the size of the tube 20 in which the piston 10 is to be used. The length L of the piston body 50 is typically preferably about 1.6 times the diameter D. The cutouts or pockets 70 and 71 each have an inner diameter selected so that the piston body 50 has an outer cylindrical wall 16 adjacent the cutout 70 and an outer cylindrical wall 17 adjacent the cutout 71. It is preferred that the thickness or radial width of each of the cylindrical walls 16 and 17 be at least 0.25", for any of various sizes of piston bodies 50 according to the present invention.

Flow rate calibration systems 30 according to the present invention are generally adapted for use in calibrating flow rates with piston-glass tube prover assemblies 35 having calibration tubes 20 having inner diameters (I.D.) ranging from about 0.5" inner diameter to about 3.0" inner diameter. Above about 3.0" diameter, the cost of precision ground glass tubes becomes high. Beyond this size, devices known in the art as bell provers are available to calibrate gas flow measuring devices.

The following table sets forth example dimensions for pistons 10 according to the present invention:

| Calibration Tube I.D. | 0.50" | 1.0" | 3.0" |
|---|---|---|---|
| Piston Diameter (Φp) O.D. | 0.506" | 1.006" | 3.006" |
| Skirt seal diameter > inside diameter of tube by: | .006" | .006" | .006" |
| Piston Length (L) | 0.8" | 1.6" | 4.8" |
| Depth of Cutout | 0.2" | 0.4" | 1.2" |
| Cutout I.D. | 0.25" | 0.5" | 2.5" |
| Skirt Thickness Adjacent Cutout | 0.25" | 0.25" | 0.25" |

Extending downwardly and outwardly from the side wall 15 of the piston body 50 is at least one sealing skirt 60 extending around the entire circumferene of the piston body 50 for sealing contact with the inner surface tube 20. Skirt 60 has a first thickness $t_1$ at its base or inner portion 61 where it connects to the piston body 50, and has a seond thickness $t_2$ at its end or outer portion 62 furthest from the piston body 50. Preferably, the first thickness $t_1$ is greater than the second thickness $t_2$ so that the skirt 60 is tapered outwardly from the piston body. According to the present invention, the skirt seal 60 comes to a very thin edge 62 that could be described as feather thin or sharp. It is preferred to keep the outer edge 62 of skirt 60 be kept thin and sharp to minimize contact area with the tube 20 and consequently minimize undesirable seal friction. Because of the dimensions of the piston body 50 and the skirt 60, however, there is adequate sealing pressure against the tube 20.

In the embodiment shown, the piston 10 includes a second sealing skirt 60' for reasons which are described below. During manufacture, in order for a cutting tool to reach the inner portion of skirt 60, a reduced diameter portion 63 is preferably machined first with a flat 65 extending inwardly from the skirt. In this manner, the cutting tool can be moved beneath the skirt 60 and the skirt 60 can be machined to very close tolerances for reasons described below. In a similar fashion, when the second skirt 60' is included, then a second reduced diameter portion 64 is also preferably included. If desired, the sealing skirts 60, 60' may be included without the inclusion of the reduced diameter portions 63, 64. However, as explained below, the reduced diameter portions are preferably also included to reduce the weight of the piston 10.

The sealing skirts 60, 60' are shown in FIG. 4 as having the outer edge 62 of the skirts 60, 60' located a distance d from the outer end 12 of piston body 50. The distance is typically comparable to the depth of the cutouts 70 or 71. As can be seen from the Table set forth above, the diameter Φp at the outer edge 62 of each of the sealing skirts 60, 60' is slightly larger than the outer diameter D, preferably about 0.003". With the skirts 60, 60' of such dimension, and having relatively thin sealing edges 62, adequate sealing with the inner wall tube 20 is provided for pressure drops encountered (usually 5" water or less) in gas flow calibration.

Further, as has been noted, sealing is obtained with minimal friction at the thin outer edges 62.

It is preferred that the piston 10 be light weight. As shown in FIGS. 2, 3, and 4 one way of reducing the weight of the piston 10 is to machine a recess 70 in the inner end 11 of the piston 10. In addition to or in substitution for the recess 70, a similar recess 71 can be machined in the outer end 12 of piston 10. In order to further decrease the weight of the piston 10, the reduced diameter recesses 63, 64 could be machined deeper or longer. Generally, there is at least one reduced diameter portion 63, 64, but there may be several depending upon the weight and manufacturing requirements. Normally, at least one of the reduced diameter portions 63, 64 is disposed between the skirt seals 60, 60'. Generally, there is at least one skirt seal adjacent to each reduced diameter portion 63, 64; however there may be need for a reduced diameter portion (not shown) at a location comparatively far from a sealing skirt 60, 60'.

Figure 5:
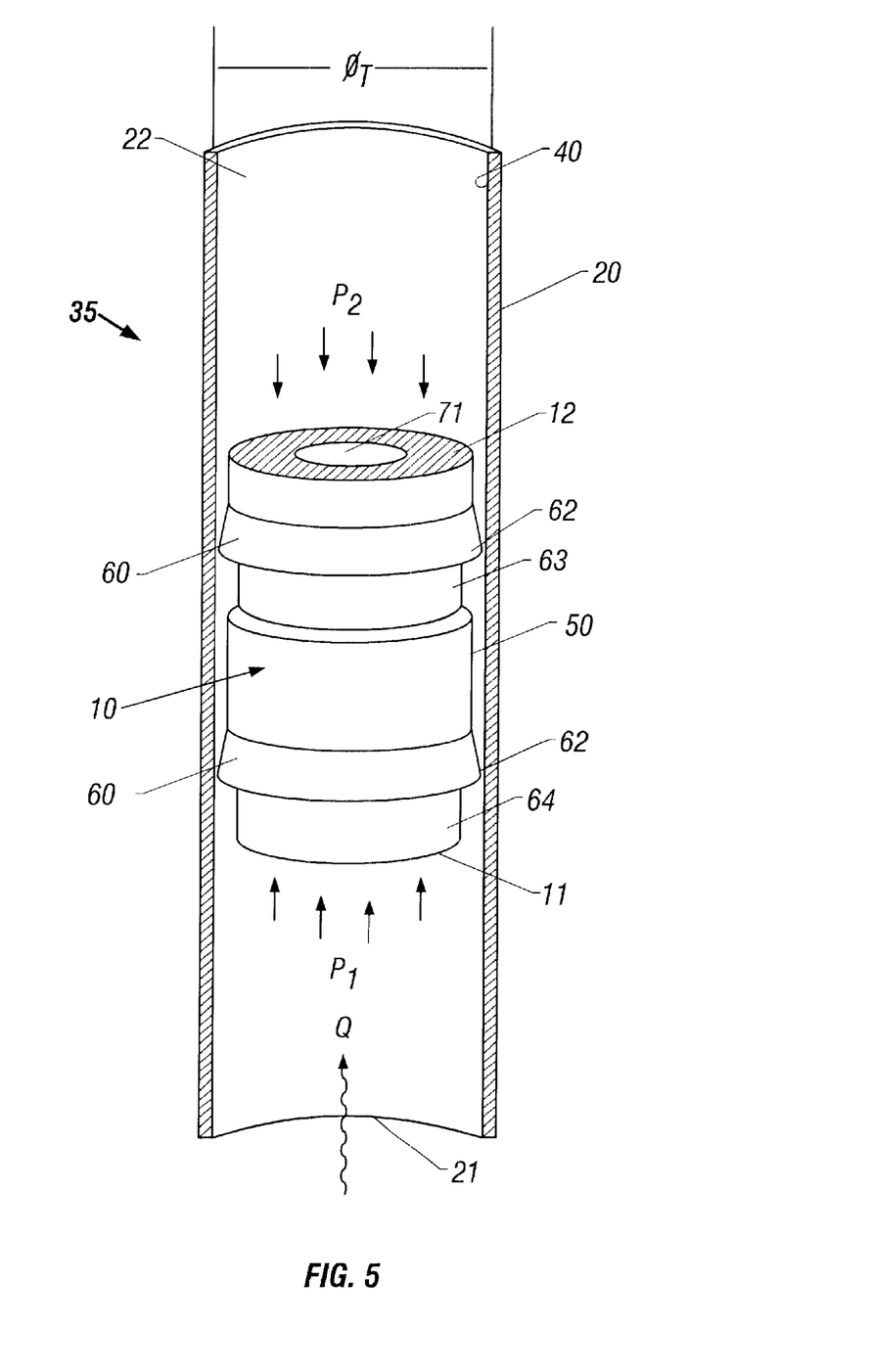
FIG. 5 is a cut-away isometric view of the piston within a glass cylinder.

Referring now to FIG. 5, the operation of the piston 10 within the tube 20 is illustrated in greater detail. The flow Q of fluid from the device 130 (FIG. 1) to be calibrated is shown as entering the tube 20 at the inlet 21. The fluid flow Q applies a pressure $P_1$ to the inner end 11 of piston 10. Another fluid, generally air from the atmosphere or some other fluid that is purposely introduced into the outer end 22 of tube 20 applies a second pressure $P_2$ to the outer end 12 of the piston 10. When the first pressure $P_1$ is sufficiently greater than the second pressure $P_2$ the piston 10 rises vertically within tube 20. This occurs when the difference in pressure is sufficient to overcome any friction between the piston 10 and the inner wall 40 of the tube 20, as well as the weight of the piston 10.

In order that an accurate measurement of the fluid flow Q be made, it is preferable that the piston 10 be very reactive to the flow Q. In other words, as soon as the flow Q enters the tube 20, the piston should begin to rise, and the piston 10 should rise a distance that is in proportion to the amount of fluid that has entered the tube 20. The piston 10 should not remain motionless in the tube 20 while pressure builds beneath it, but instead should begin moving when comparatively little pressure has built up beneath it. It is therefore most preferable that the piston 10 be light weight, that none of the fluid flow Q leaks or gets past the piston 10, and that there be very low friction between the sealing skirt 60 and the inner wall 40 of the tube 20.

If, for example, there were a large amount of friction between the inner surface 40 of tube 20 and the sealing skirt 60 of piston 10, then the fluid flow Q would compress and pressure $P_1$ would increase, but piston 10 may not move. As a result, the piston displacement would be less than it would have been absent friction. Consequently, the volume of fluid measured by the piston displacement would be less than the volume of fluid that flowed out of the device 130 to be calibrated. The results would be similar if the piston 10 were too heavy or if the seal between skirt 60 and the inner wall 40 of tube 20 were to leak.

In a preferred embodiment, by using a lightweight piston 10 made of a resilient material with a flexible sealing skirt 60, within a tube 20 having precision ground inner surface 40, the present invention has been able to very accurately measure the fluid flow Q. The sealing skirt 60 is preferably machined to be adequately thin so that it can flex to accommodate any irregularities on the inner surface 40 of the tube 20. In this manner, none of the fluid flow Q can leak or get past the piston 10. Furthermore, the thin construction of the sealing skirt 60 generally applies very little force against the inner wall 40 of tube 20, thereby lowering the coefficient of friction between the inner wall 40 and the sealing skirt 60. In a preferred embodiment, the piston 10 is manufactured from a fluorinated hydrocarbon known to exert very small frictional forces. The piston 10 is preferably machined to very close tolerances so that the actual diameter of the sealing skirts 60, 60' does not vary from the design diameter by more than achievable machining tolerances. With the present invention, it has been found that by using the piston of the present invention machined to such precision, the seal between the sealing skirt 60, 60' can be maintained while the frictional forces between the piston 10 and the tube 20 can be reduced. It has also been found that the interface between the sealing skirt 60, 60' requires no lubrication, and requires no supplemental sealing material such as mercury or other liquid sealant. In other words, the seal afforded by the present invention can be termed a dry seal.

The piston 10 preferably has two sealing skirts, a first sealing skirt 60 located toward the outer end 12 of the piston 10, and a second sealing skirt 60' located toward the inner end 11 of the piston 10. If desired, more sealing skirts of similar configuration could be added depending upon design requirements. It has been found that using two sealing skirts 60, 60' prevents the piston 10 from becoming misaligned and catching or "cocking" in the tube 20, i.e. the piston 10 stays in very close alignment with the inner wall 40 of the tube 20. If the piston 10 were to misalign in the tube, then the seal afforded about the piston 10 would be lost. This would result in an inaccurate measurement as described above.

In another preferred embodiment, the lower or inner sealing skirt 60' actually does not act as a seal at all, but instead allows the fluid flow Q to pass. In that particular embodiment, the effective operation of the piston 10 depends upon the integrity of the upper or outer sealing skirt 60. The advantage of having the inner sealing skirt 60' allow fluid to pass is that the inner sealing skirt 60' still provides mechanical stability to the piston 10 and prevents the piston 10 from misaligning or catching in the tube 20. At the same time, the outer sealing skirt 60 "pulls" the piston 10 upward or outward, rather than the inner sealing skirt 60' pushing the piston 10. This prevents cocking and jamming even further. In an embodiment where the inner seal 60' is meant to allow the fluid flow Q to pass by the sealing skirt 60', the sealing skirt 60' may be notched or scored, as with a utility knife or razor blade. In this manner, fluid can pass sealing skirt 60', but the sealing skirt 60' nevertheless provides mechanical stability to the piston 10.

Forces on a body due to pressure can be calculated by taking the product of pressure and the surface area over which the pressure acts. If one is mainly concerned with forces acting along a single axis, i.e. up and down within tube 20, then the surface area that matters can be described as the projection of a three dimensional surface onto a two dimensional plane. For example, as best shown in FIGS. 3 and 4, the surface area over which any pressure on either the outer end 12 or inner end 11 would act can be described by the formula $\pi \phi_p^2/4$, where $\pi$ is the well known mathematical constant and $\phi_p$ is the diameter of the piston. When installed inside the calibration tube, the diameter of the piston $\phi_p$ is preferably equal to the inside diameter of the calibration tube $\phi_T$. This is because prior to installation into the tube 20, the piston 10 has outside diameter $\phi_p$ which is greater than the inside diameter $\phi_T$ of the calibration tube 20.

In one embodiment, the diameter $\phi_T$ of the tube 20 is about 0.006" less than the diameter $\phi_p$ of the piston. In this manner, when the piston 10 is installed into the tube 20, there is an interference fit between the piston 10 and the tube 20 and the sealing skirts 60, 60' are "squeezed" into the inner diameter of the tube 20. As shown in FIG. 5, various forces act upon the piston 10, including a force due to the pressure $P_1$ acting over the area just described, a force due to pressure $P_2$ acting over the same area, forces due to friction, and forces due to the weight of the piston itself. The piston 10 of the present invention is capable of moving within the tube even when the difference in pressure or pressure differential between $P_1$ and $P_2$ is about 5.0" water, the standard conditions under which gas flow is calibrated.

If desired, the piston may be able to travel within the calibration tube when the pressure differential is less than about 2.5" water. Alternatively, the net force due to pressure acting on the piston can be described as the product of the pressure differential ($P_1—P_2$) and the cross sectional area of the calibration tube ($\pi\phi_T^2/4$).

The foregoing disclosure and description of the invention are illustrative and explanatory thereof, and various changes in the size, shape and materials, and components, as well as in the details of the illustrated construction may be made without departing from the spirit of the invention.

I claim:

1. A low friction piston for sealing an inner surface of a gas flow calibration system comprising:
    a piston body being movable longitudinally in the calibration tube in response to a gas flow in the calibration system, the piston body being formed of a resilient material;
    a first sealing skirt extending from a portion of the piston body to contact the inner surface of the calibration tube and seal against leakage of the gas flow past the piston body in the calibration tube; and
    a second sealing skirt integrally formed with and extending from a portion of the piston body to contact the inner surface of the calibration tube, the second sealing skirt having passages adapted to allow the gas flow to pass by the second sealing skirt.

2. The low friction piston of claim 1, wherein the inner surface of the tube includes an inner diameter and the second sealing skirt has an outer diameter greater than the inner diameter of the tube.

3. The low friction piston of claim 1, wherein the resilient material of the piston body is fluorinated hydrocarbon.

4. The low friction piston of claim 1, wherein at least one sealing skirt is adapted to be in dry contact with the inner surface of the calibration tube.

5. The low friction piston of claim 1, wherein at least one sealing skirt of the piston is adapted to contact the inner surface of the calibration tube with an interference fit.

6. The low friction piston of claim 1, wherein the inner surface of the tube has an inner diameter and at least one sealing skirt has an outer diameter greater than the inner diameter of the tube.

7. The low friction piston of claim 1, wherein at least one sealing skirt has a first thickness adjacent the piston body and has a second thickness adjacent the inner surface of the calibration tube, and the first thickness is greater than the second thickness.

8. The low friction piston of claim 1, wherein the piston body includes a weight reducing cavity formed in an outer end of the piston body.

9. The low friction piston of claim 1, wherein the piston body includes a weight reducing cavity formed in an inner end of the piston body.

10. The low friction piston of claim 1, wherein the piston body has an outside diameter and at least one reduced diameter portion having a diameter which is less than the outside diameter of the piston body.

11. The low friction piston of claim 1, wherein the first sealing skirt is formed integrally with the piston body.

12. The low friction piston of claim 1, wherein the resilient material of the piston body is a synthetic resin material.

13. A low friction piston-glass tube prover assembly for use in a gas flow calibration system comprising:
    a calibration tube having an inner surface;
    a piston with an outer end and an outside diameter, the piston being disposed within the calibration tube in sealing communication with the inner surface of the calibration tube;
    a first flexible sealing skirt disposed on the piston in contact with the inner surface of the calibration tube; and
    a second sealing skirt formed integrally with the piston and contacting the inner surface of the calibration tube, the second sealing skirt having passages adapted to allow the gas flow to pass between the second sealing skirt and the inner surface of the calibration tube.

14. The low friction piston-glass tube prover assembly of claim 13, wherein the second sealing skirt has an inner portion connected to the piston, and an outer portion in contact with the inner surface of the tube, and the inner portion is thicker than the outer portion.

15. The low friction piston-glass tube prover assembly of claim 13, wherein the inner surface of the calibration tube has an inner diameter, and the second sealing skirt has an outer diameter greater than the inner diameter of the calibration tube.

16. The low friction piston-glass tube prover assembly of claim 13, wherein at least one sealing skirt has an inner portion connected to the piston, and an outer portion in contact with the inner surface of the tube, and the inner portion is thicker than the outer portion.

17. The low friction piston-glass tube prover assembly of claim 13, wherein at least one sealing skirt of the piston is in dry contact with the inner surface of the calibration tube.

18. The low friction piston-glass tube prover assembly of claim 13, wherein at least one of the sealing skirts contacts the inner surface of the calibration tube in an interference fit.

19. The low friction piston-glass tube prover assembly of claim 13, wherein the inner surface of the calibration tube has an inner diameter, and the sealing skirt has an outer diameter and the outer diameter of at least one of the sealing skirts is greater than the inner diameter of the calibration tube.

20. A tube prover flow calibration system comprising:
    at least one calibration tube, having an inner surface and an inner diameter;
    at least one piston having an outer end, an inner end and an outside diameter disposed within the at least one calibration tube in sealing communication with the inner surface of the cylindrical tube;
    at least one flexible sealing skirt located toward the outer end of the at least one piston for maintaining continuous contact with the inner surface of the tube;
    a second sealing skirt formed integrally with the piston and contacting the inner surface of the calibration tube, the second sealing skirt having passages adapted to allow the gas flow to pass between the second sealing skirt and the inner surface of the calibration tube; and
    a processor for computing gas flow rate based upon sensed movement of the piston within the tube.

21. The calibration system of claim 20, wherein the second sealing skirt has an inner portion connected to the piston, and an outer portion in contact with the inner surface of the tube, and the inner portion is thicker than the outer portion.

22. The calibration system of claim 20, wherein the inner surface of the calibration tube has an inner diameter, and the second sealing skirt has an outer diameter greater than the inner diameter of the calibration tube.

23. The calibration system of claim 20, wherein at least one sealing skirt has an inner portion connected to the piston, and an outer portion in contact with the inner surface of the tube, and the inner portion is thicker than the outer portion.

24. The calibration system of claim 20, wherein at least one sealing skirt of the piston is in dry contact with the inner surface of the calibration tube.

25. The calibration system of claim 20, wherein at least one of the sealing skirts contacts the inner surface of the calibration tube in an interference fit.

26. The calibration system of claim 20, wherein the inner surface of the calibration tube has an inner diameter, and the sealing skirt has an outer diameter greater than the inner diameter of the calibration tube.

27. A low friction piston for sealing an inner surface of a gas flow calibration tube in a flow calibration system comprising:

a piston body being movable longitudinally in the calibration tube in response to a gas flow in the calibration system, the piston body being formed of a material;

a first sealing skirt extending outwardly from a portion of the piston body to contact the inner surface of the calibration tube and seal against leakage of the gas flow past the piston body in the calibration tube; and a second sealing skirt integrally formed with and extending outwardly from a portion of the piston body in a corresponding direction to the first sealing skirt to contact the inner surface of the calibration tube to provide proper alignment of the piston body in the calibration.

* * * * *